US005664098A

United States Patent [19]
Bianchi et al.

[11] Patent Number: 5,664,098
[45] Date of Patent: Sep. 2, 1997

[54] DUAL DECOR CAPABILITY FOR A HOST SYSTEM WHICH RUNS EMULATED APPLICATION PROGRAMS TO ENABLE DIRECT ACCESS TO HOST FACILITIES FOR EXECUTING EMULATED SYSTEM OPERATIONS

[75] Inventors: Richard S. Bianchi, Billerica; Thomas S. Hirsch, Bedford, both of Mass.; Ron B. Perry, Wilton, N.H.

[73] Assignee: Bull HN Information Systems Inc., Billerica, Mass.

[21] Appl. No.: 311,655

[22] Filed: Sep. 23, 1994

Related U.S. Application Data

[63] Continuation-in-part of Ser. No. 128,456, Sep. 28, 1993.
[51] Int. Cl.[6] .............................. G06F 11/00; H04L 9/00
[52] U.S. Cl. ...................... 395/186; 395/527; 395/651; 395/712
[58] Field of Search .................................. 395/186, 187.1, 395/188.1, 500, 650, 700, 651, 527, 712; 380/4

[56] References Cited

U.S. PATENT DOCUMENTS

| | | | |
|---|---|---|---|
| 4,747,040 | 5/1988 | Blanset et al. | 395/650 |
| 4,918,653 | 4/1990 | Johri et al. | 395/650 |
| 5,204,961 | 4/1993 | Barlow | 395/187.01 |
| 5,361,359 | 11/1994 | Tajalli et al. | 395/700 |
| 5,421,006 | 5/1995 | Jablon et al. | 395/183.12 |
| 5,452,460 | 9/1995 | Distelberg et al. | 395/700 |

*Primary Examiner*—Krisna Lim
*Assistant Examiner*—Viet Vu
*Attorney, Agent, or Firm*—Faith F. Driscoll; John S. Solakian

[57] ABSTRACT

A host data processing system which includes a plurality of input/output devices operates under the control of an enhanced version of the UNIX operating system. The host system includes an emulator which runs as an application process for executing user emulated system (ES) application programs. The emulator includes a number of emulated system executive service components operating in shared memory and an interpreter, an emulator monitor call unit (EMCU) and a number of server facilities operating in the host memory. The ES executive service components are extended to accommodate a number of dual decor commands and functions which make host system facilities directly available to ES application programs by concurrent execution of program operations within both the emulator and host system environments. The EMCU includes mechanisms for performing an initial level security validation operation which allows subsequent trusted verification of user identity when dual decor commands or functions are invoked. The server facilities include mechanisms for performing a two-step security validation process for ensuring security relative to preventing both unauthorized user access and compromises in user data through improper use of dual decor commands or functions.

16 Claims, 7 Drawing Sheets

DUAL DECOR CAPABILITY FOR A HOST SYSTEM WHICH RUNS EMULATED APPLICATION PROGRAMS TO ENABLE DIRECT ACCESS TO HOST FACILITIES FOR EXECUTING EMULATED SYSTEM OPERATIONS

This is a continuation-in-part of copending patent application Ser. No. 08/128,456, filed on Sep. 28, 1993.

RELATED APPLICATION(S)

1. The patent application of John L. Curley, Thomas S. Hirsch, James W. Stonier and Kin C. Yu entitled, "Mechanism for Enabling Emulation System Users to Directly Invoke a Number of Host System Facilities for Executing Host Procedures Interactively or Non-Interactively," filed on Sep. 23, 1994, bearing Ser. No. 08/311,649 and which issued as U.S. Pat. No. 5,572,711 on Nov. 5, 1996 and which is assigned to the same assignee as this patent application.
2. The patent application of Thomas S. Hirsch, Richard S. Bianchi and Ron B. Perry entitled, "Mechanism for Linking Together the Files of Emulated and Host System for Access by Emulated System Users," filed on Sep. 23, 1994, bearing Ser. No. 08/311,646 which is assigned to the same assignee as this patent application.
3. The patent application of Thomas S. Hirsch, Richard S. Bianchi, Ron B. Perry and Kenneth S. Buck entitled, "Mechanism for Transferring Files of a Host System and an File System," filed on Sep. 23, 1994 bearing Ser. No. 08/311,652 which is assigned to the same assignee as this patent application.

BACKGROUND OF THE INVENTION

1. Field of Use

The present invention relates to the emulation of one computer system by another computer system, and more particularly to software emulation.

2. Prior Art

With the rapid evolution of higher speed computer systems and new microprocessor chip designs, users now have even a greater need to have their application programs written for a specific computer system run on different computer systems. Moreover, it becomes more important than ever to provide this capability without having to convert or port such application programs. Therefore, a number of vendors have developed both hardware and software approaches to achieve this result without having to convert or port such application programs.

One prior art system achieves the above by providing the capability of running a plurality of different operating systems. Each operating system is defined as having an interior decor and are utilized by an apparatus which isolates the operating systems and ensures that only the instructions of the currently active operating system are executed. This system is disclosed in U.S. Pat. No. 4,530,052 to James L. King entitled, "Apparatus and Method for a Data Processing Unit Sharing a Plurality of Operating Systems" which issued on Jul. 16, 1985 and is assigned to the assignee named herein. This system has the limitation of not being able to run more than one operating system at a time.

Another prior art system provides a plurality of central processing units each of which tightly couples together and utilizes a different type of operating system. The central processing units in combination with their operating systems operate in a peer relationship in which all systems have access to all system resources. To ensure the integrity of the most secure of the operating systems (i.e., deemed the proprietary operating system), certain mechanisms are included in the system for enforcing certain restrictions on the other less secure operating system (i.e., deemed the non-proprietary operating systems). These restrictions are that a non-proprietary operating system can only access memory allocated by the proprietary operating system and can use only those channels and input/output instructions specifically assigned by the proprietary operating system. Stated differently, mechanisms are provided to prevent the intentional or unintentional use of resources not assigned to the particular central processing unit and operating system combination.

The above system is disclosed in U.S. Pat. Nos. 5,027,271 and 5,230,065 invented by John L. Curley, et al. entitled, "Apparatus and Method for Alterable Resource Partitioning Enforcement in a Data Processing System Having Central Processing Units using Different Operating Systems" and "Apparatus and Method for a Data Processing System Having a Peer Relationship Among a Plurality of Central Processing Units" which issued on Jun. 25, 1991 and Jul. 20, 1993, respectively, and are assigned to the same assignee as named herein. It will be noted that while this system enables the running of more than one operating system, it requires the use of separate independent central processing units and mechanisms for enforcing the use of only assigned system resources.

When running different operating systems within a system, it becomes desirable to provide a user with the capability of utilizing both systems in an efficient manner. In the prior art system of U.S. Pat. Nos. 5,230,065, a user is allowed access to both operating systems through a user registration process performed on the proprietary operating system whose results are then transferred to the non-proprietary operating system. When a user has been registered on the proprietary operating system as having access to both systems, the user can issue a special switch command which switches the user's terminal over to the non-proprietary operating system. The switch command allows permanent access (i.e., access until logout from the current session) or temporary access (i.e., access to execute a single command) to the non-proprietary operating system. During this access, the user is able to issue commands while running on the non-proprietary operating system which may for example allow the transfer of data to the other operating system. For a further description of this system and operations, reference may be made to the publication entitled "GCOS6 HVS6 PLUS XC Processor Systems Basics" published by Bull HN Information Systems Inc., dated December, 1991, order number LH39-02.

While the above prior art arrangement allows a user access to both operating systems, such access takes place at the user level while both operating systems maintain their independent mode of operation. It will be noted that this type of access capability can only be invoked at a high level and still requires user interaction with both operating systems as independent entities. Hence, this capability was in effect built on top of both operating systems, relying heavily on a user's ability to issue the proper sequence of commands to both systems for the execution of the appropriate procedures by each operating system. This arrangement is less efficient since it can be very cumbersome and time consuming to use.

Further, the above prior art arrangement does not provide for stringent security enforcement within both operating systems. That is, the proprietary operating system validates security as to unauthorized access for the entire system through the proprietary operating system's log-in mechanism. As to security for preventing compromises in data, the system includes mechanisms which enable the proprietary operating system to enforce resource restrictions on the non-proprietary system. Thus, this type of approach would not be effective in systems such as that of the present invention in the case where the application programs being run on the proprietary operating system are the application programs which are required to be emulated by the host system.

Furthermore, in the type of prior art proprietary operating system contemplated, information disclosing a substantial part of the organization of the operating system and its associated data structures historically have been made accessible to users. Therefore, it is likely that a knowledgeable user could intentionally or unintentionally alter the operating system data structures defining the user's identity and data access rights to gain access to other user system data files. Since this type of activity would go undetected in the prior art system and therefore unpreventable, this would result in significant compromises in system security.

Accordingly, it is a primary object of the present invention to provide access to host facilities for more efficient execution of application programs being emulated on a host system.

It is another object of the present invention to provide a method and system which enables application programs running in an emulation environment on a host system to be efficiently executed in a highly secure manner.

It is still another object of the present invention to provide a method and system for executing application programs running in an emulation environment on a host system which requires no changes to the host system operating system facilities thereby facilitating software enhancement and support.

SUMMARY OF THE INVENTION

The above and other objects of the present invention are achieved in a preferred embodiment of the host data processing system of the present invention which includes a plurality of input/output devices and operates under the control of a non-proprietary operating system. In the preferred embodiment, the operating system is an enhanced version of the UNIX* operating system known as the AIX operating system developed by IBM Corporation. The host system includes an emulator which runs as an application process for executing user emulated system (ES) application programs which in the preferred embodiment were originally written for use on the DPS6 and DPS6000 family of computers and the GCOS6* and HVS operating systems developed by Bull HN Information Systems Inc.

The emulator includes a number of emulated system executive service components (e.g., HVS executive service components) operating in ES and host system shared memory environment and an interpreter, an emulator monitor call unit (EMCU) and a number of server facilities operating in the host system memory environment. The ES executive service components are extended and modified to accommodate a number of dual decor commands and functions which make host system facilities directly available to ES application programs by concurrent execution of program operations within both emulator and host system environments.

The EMCU includes mechanisms for performing an initial level security validation operation which allows subsequent trusted verification of user identity when dual decor commands or functions are invoked. The server facilities include mechanisms for performing a two step security validation process for ensuring security relative to preventing both unauthorized user access and compromises in user data through improper use of dual decor commands or functions The first step validates security at the user level and the second step validates security at the file level.

More specifically, first, the system validates that the user invoking the operation is in fact a trusted dual decor user This is carried out by using a unique encrypted description entry of each dual decor user which was previously stored in a user table located in the host memory environment which is inaccessible to ES users. The storing of the entry is done as part of the login procedure in which the ES system, upon verifying that the user is a dual decor user, issues a special monitor call to the EMCU. After validating that the special monitor call came from the proper source, the EMCU verifies that the user is an authorized host system user through the host encrypted password facilities. Once the user identity has been authenticated, the ES system creates the appropriate entry in the user table, which uniquely defines the personality of the user.

In accordance with the present invention, this encrypted description entry has three basic parts or components. These are: the emulated system user id itself which, during the log-in procedure, was established as matching the host user identification; the address of a first emulated system data structure defining the location of the user control block (UCB) and the address of a second emulated system data structure defining the location of the group control block (GCB). The addresses of each set of these data structures are uniquely assigned to a user by the appropriate ES system component during login and only a single copy for any given ES user exists in memory. By maintaining this set of uniquely assigned addresses of these data structures and associating them with the user id, the system of the present invention is, now able to determine during the first step of the verification that the user is a trusted dual decor user at the point when a dual decor command or function is invoked by the user.

The user personality is validated by the EMCU confirming that on description or personality of the user has not been changed. That is, the user has not changed the user id so that it no longer is associated with the same set of UCB and GCB originally assigned addresses indicating that the user's personality has been changed.

If the user description is established as being valid, then the required type of server facilities are created or assigned and necessary connections are made between the server facilities and the ES component which initiated the dual decor command or operation.

If the system determines that the user invoking the dual decor command or function is not a legitimate dual decor user, the system takes no further action (i.e., does not establish the necessary connections) to execute the dual decor command or function. Thus, there is no way for the user to have the command or function executed thus ensuring security. The user is notified of the violation by the particular ES component which initiated the operation.

The second step is performed by the server facilities at the file or directory level at file access time (open) using the built-in file protection mechanisms of the host system to compare the user permissions within the group to which the user belongs against the permissions associated with the data files to be accessed to verify that they are correct. If correct, the requested operation is allowed to proceed. If the user is determined as not having the required level of permission, the server facilities do not perform the requested operation and the user is notified of the access security violation.

In the preferred embodiment, a dynamic server handler (DSH) included as part of the server facilities performs the first step of the security validation operation for essentially all of the different types of dual decor commands and functions. The access check step is performed at a lower level by a server assigned or created by the DSH unit to perform the particular dual decor operation. Access control checking is done at a lower level where it can be executed by the specific type of server designed to handle that operation and for more effective validation of each type of dual decor file access requests (e.g., open, read, write). For example, this arrangement ensures security in those situations where it is not possible to determine the type of access being requested by a particular user before an initial phase of the operation is allowed to take place.

In accordance with the teachings of the present invention, a number of different types of dual decor commands or functions are provided as part of the dual decor facilities. Dual decor commands and functions are designated in two ways. They are designated in the form of new commands or as extensions to existing commands such as by the inclusion of uniquely designed arguments designating host system entities (e.g., host path or procedure names).

The dual decor commands and functions allow an emulated system user to augment execution of their emulated system application programs with host application programs and mechanisms. The present invention provides these capabilities through the integration of dual decor functionality within the emulation facilities which makes certain operations easier to perform using single or combinations of dual decor commands.

For example, one dual decor command known as an XShell command, can be used to replace an existing application such as an office automation application with an equivalent host application. Other dual decor commands can be used to take advantage of the host file and data transfer mechanisms. For example, a user can use a command known as a CopyX command to move files in the ES system to the host system from where they can be transferred to another system via the host system's file transfer facility (FTP) which can be invoked by an XShell command.

Additionally, dual decor commands then can be used to perform operations on files located in both systems during the same session. Also, dual decor commands can be used to perform operations on a file previously maintained by the ES system which is now being maintained by the host system (e.g., a dump file). A dual decor command known as a link file command, can be used to link together directory files located in both systems so that a given ES program such as an editor, can be used to edit files on both systems during the same session. Another form of the same command can be used to enable programs within the two systems work cooperatively to carry out a given operation. For example, a link pipe version of the command can be used to provide host named pipes facilities for enabling the output data from an ES program to be used as the input to a host program or visa versa while both programs are being executed by their respective systems. These are some of the basic features and advantages provided by the preferred embodiment of the present invention. These features and functions allows users to make the transition from an emulated system environment to a host system at their own pace. For further information regarding these commands, reference may be made to the referenced related copending patent applications.

The above objects and advantages of the present invention will be better understood from the following description when taken in conjunction with the accompanying drawings.

DESCRIPTION OF THE PREFERRED EMBODIMENT

Figure 1A:
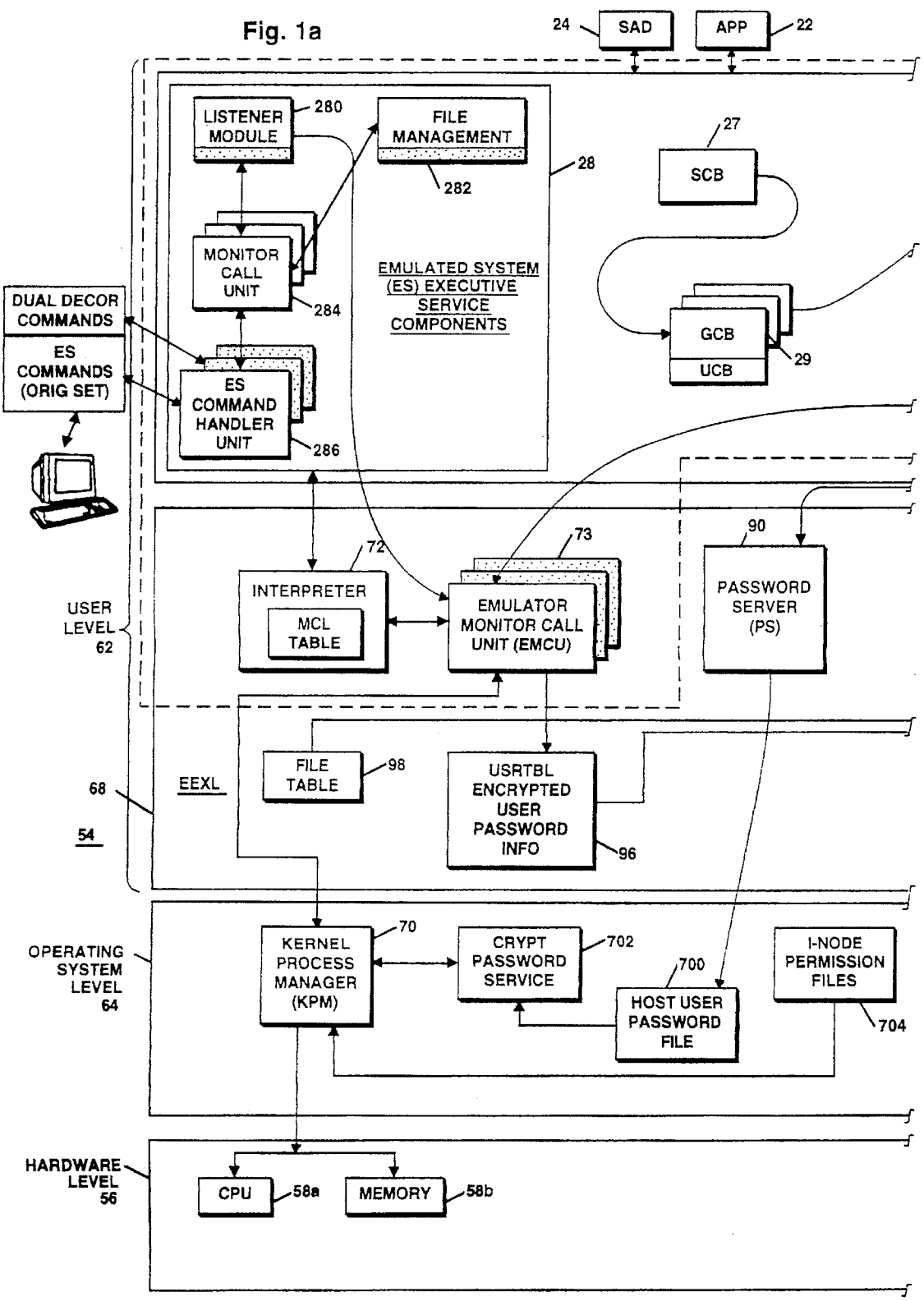
FIGS. 1a and 1b illustrate in block diagram form a host system winch incorporates the dual decor functionality according to the teachings of the present invention.
Figure 1B:
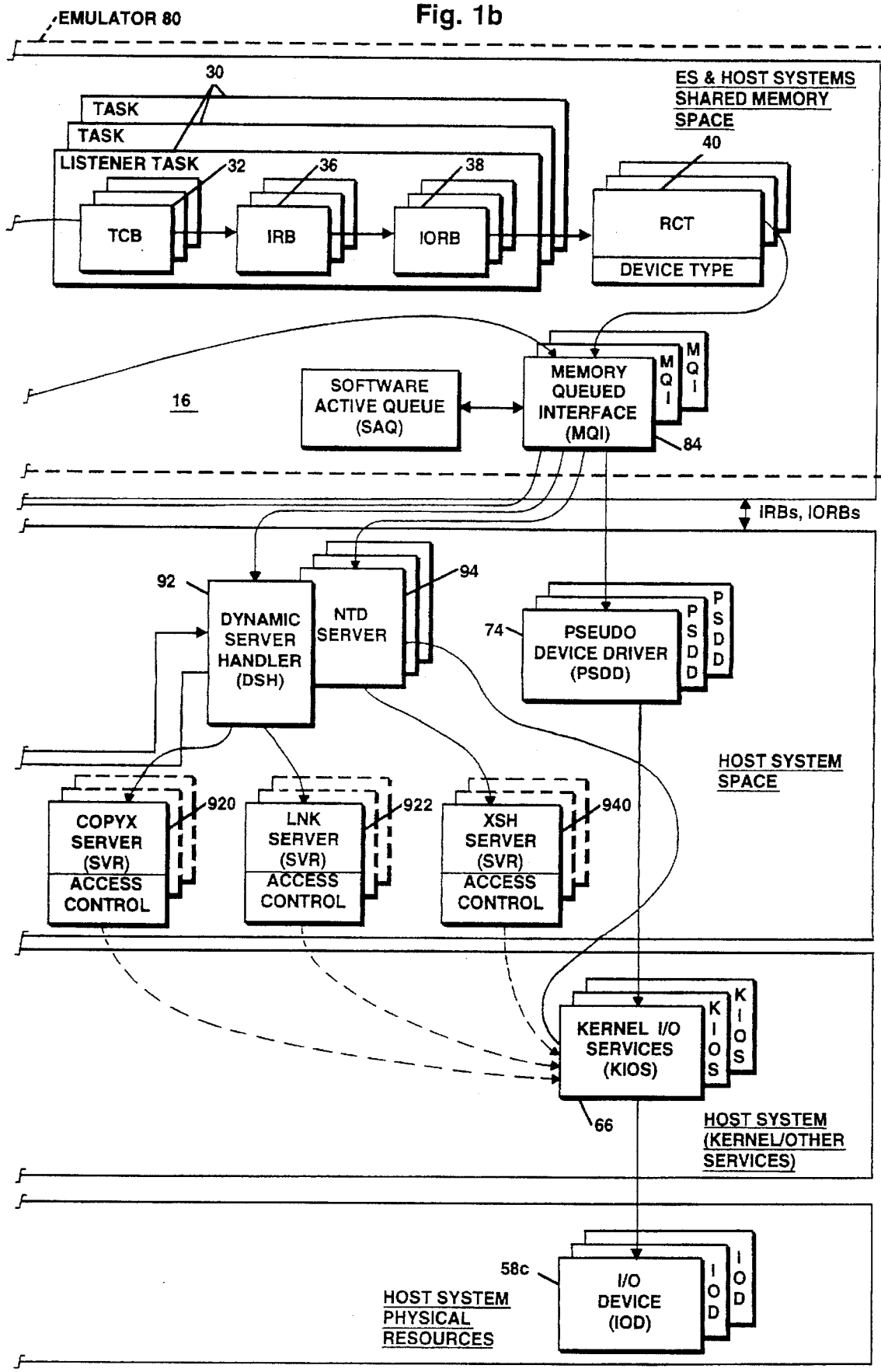

FIGS. 1a and 1b illustrate in block diagram form a host system 54 which incorporates the dual decor components of the present invention. As shown, the system 54 includes a hardware platform 56 which contains the hardware elements such as a central processing unit 58a, a main memory 58b and a number of input/output peripheral/communications devices including a local area network for connecting system 54 to other processing systems via standard communication network facilities.

The central processing unit (CPU) represented by block 58a is a reduced instruction set (RISC) based processing unit which takes the form of the RS6000 microprocessor manufactured by IBM corporation. The hardware platform 56 may also take the form of the DPX/20 system marketed by Bull HN Information Systems Inc.

As seen from FIG. 1a hardware platform including processing unit 58a operates under the control of an enhanced version of the UNIX operating system such as the AIX operating system. Portions of physical memory represented by MEM block 58b are illustrated in terms of the layered construction. As shown, memory is divided into two basic levels, a user level d an operating system level. The user level is divided into emulated system (SS) and host shared memory space and host or an operating system kernel native memory space. The shared memory space contains the ES executive level 16 which includes a plurality of executive program tasks 30 spawned by ES executive services components of block 28 for executing ES application programs 22 and system administrator programs 24.

In the emulated system, each task 30 utilizes a plurality of data control structures, such as a task control block (TCB) structure 32, an indirect request block (IRB) structure 36, an input/output request block (IORB) structure 38 and a resource control table (RCT) structure 40. The task control block (TCB) structure 32 contains information pertaining to the state of execution of the associated task as well as pointers to interrupt save areas for storing hardware parameters related to the task. The indirect request block (IRB) structure 36 contains information defining the operation requested by an associated task and includes pointers identifying the task and its associated task control block (TCB) and a pointer to the associated IORB structure.

The input/output request block (IORB) structure 38 is used as the standard means of requesting a physical I/O service. It contains information such as a local resource number (LRN) that identifies the I/O device being addressed as well as the location and size of the buffer to be used for the transfer and the specific function (operation) requested. The resource control table (RCT) structure 40 contains information describing the resources, such as its characteristics or information regarding the tasks or requests being executed by a corresponding resource as well as pointers to its associated task control block (TCB) structure.

Additionally, two other structures depicted in FIG. 1a utilized by the present invention are a group control block (GCB) structure and a user control block structure of block 29. The GCB structure contains information required to define and control the operations of a specific task group which defines a named set of one or more tasks with a common set of resources within which a user and system function must operate. Each group has a two character name (e.g., $L, $S) by which the group is uniquely known to the system. The GCB structure includes information identifying the lead task whose execution spawns all other tasks required for executing group programs. As indicated, the GCB structure includes a number of user control blocks (UCB), each of which contains information defining the user's personality such as user node identification, user group id within a node, user task id within group, user person id and pointer information to directories to which the user has access.

As shown, the emulated system utilizes a further data structure corresponding to system control block (SCB) structure 27. This data structure is created at system and startup and contains information defining system resources and pointers to the different task groups established by the system represented by a corresponding number of group control blocks in the system. For further information regarding such structures and their relationships to each other, reference may be made to U.S. Pat. No. 5,111,384 and the publication entitled "HVS PLUS Systems Concepts" published by Bull HN Information Systems Inc., Order No. HE03-01.

As indicated in FIG. 1b the shared memory space further includes a memory queued interface (MQI) represented by block 84 which provides a form of interprocess communication mechanism and a software active queue (SAQ) of block 88. SAQ block 88 represents a data structure used to provide the path by which the results of the operations performed by the kernel level components are passed back or returned by the host processes to the requesting emulated system user level tasks 30 being executed. Thus, it can be viewed as functioning as an output stage of MQI 84. This data structure is similar to data structures which are used by the emulated system operating system.

MQI block 84 is a semaphore data structure which takes the form of a single linked list controlled by semaphores through a set of routines which are executed by the various host processes operating within different levels or layers that want to communicate with each other. Its routines are used to manage queues within the pseudo device drivers 74 and the software active queue 88.

Executive Services Components 28

As seen in FIG. 1a, the executive services components 28 of executive layer 16 includes a plurality of components or facilities which are equivalent to those facilities normally included in emulated system. The facilities utilized by the present invention include a listener module 280, a file management facility 282, a monitor call unit 284 and a ES command handler unit 286 which are arranged as shown. The listener module 280 is responsible for monitoring the operations of terminals configured for login, and for initiating user tasks in response to user commands. As indicated in FIGS. 1a and 1b listener module 280 runs as a task 30 with its own set of unique data structures.

As described herein, the listener module 280 is able to consult a profiles file containing user specific registration information such as user id, login id and password requirements tabulated by the system administrator for all registered users. The listener module 280 checks the user profile when monitoring the privileges and/or restrictions given to each user. The file management facility 282 includes the conventional shared data structure and set of routines normally provided to perform functions that access such data structure to control the synchronization of concurrent processes or tasks in addition to performing various system services o functions. That is, the facility responds to system service monitor calls identifying the types of services requested (e.g. creating or deleting files, reading or writing records or blocks in files) which remit in the specified system services being executed by the emulated system on behalf of executing user application programs.

The monitor call unit 284 receives monitor calls from the interpreter component 72 which are in turn to be executed interpretively using the ES executive service components of block 28. The command handler unit 286 contains the routines that respond to user commands entered via a terminal or program. In response to such commands, the unit 286 routines invoke the appropriate tasks for executing such commands. As discussed herein in greater detail, each of these components have been augmented or extended to incorporate different dual decor aspects or features according to the teachings of the present invention.

Emulator level layer 68

As indicated in FIG. 1a the next layer within the user level is the emulator executive level 68. This level includes certain components present in the emulated system which have been transformed into new mechanisms which appear to the remaining unchanged components to operate as the original unchanged components of the emulated system. At the same time, these new mechanisms appear to the components of the kernel level 64 as native components with which the host system is accustomed to operate. As shown, the components include the interpreter 72, an emulator monitor call unit (EMCU) 73, a plurality of servers 90, through 940, and a plurality of pseudo device drivers (PSDD) 74 arranged as shown.

Additionally, level 68 includes a data structure in the form of user table 96 which contains entries which uniquely define the personalities of the different dual decor users. This table is maintained to be able to determine that a given user has successfully gone through the login procedure. In accordance with the present invention, each such encrypted user description entry has three basic parts or components. These are: the emulated system user id itself which during the log-in procedure was previously established as matching the host user identification; the address of a first emulated system data structure defining the location of the user control block (UCB) and the address of a second emulated system data structure defining the location of the user group control block (GCB). The Appendix shows the format of these entries in greater detail.

The interpreter 72 successively fetches the instructions of an emulated system application program, categorizes each instruction and executes it interpretively through sequences of RISC instructions which allows CPU 58a, MEM 58b and other elements of host system 54 to emulate the operations of corresponding elements of the emulated system. The interpreter 72 includes a monitor call (MCL) table containing information for each possible monitor call which it utilizes to determine whether to trap or send an ES monitor call to the ES executive services components 28 for execution of the instruction or to make an emulator call to EMCU 73 for execution of the instruction through the services of an appropriate C language routine (server). The EMCU 73 is responsible for acquiring from the host system 54, the necessary memory and other resources, for initializing the emulated system data structures and invoking interpreter 72 and the various server processes. Both the interpreter 72 and EMCU 3 run as host processes but not as root.

As viewed by the host system, the ES service components 28 and tasks 30 being executed on behalf of the application programs, the interpreter 72 and EMCU 73 are executed in the system 54 of FIG. 1 as a single process 80 wherein such process corresponds to one or more user processes as defined by the conventions of the host operating system being run on host system 54. Thus, it is possible to have multiple instances of the emulated system concurrently emulated on host system 54.

The password server 90, the dynamic server idler (DSH) 92 and the network terminal driver (NTD) server 94 are created by EMCU 73 during initialization. Each of the servers 90, 92 and 94 communicate with emulated system processes through MQI 84 as indicated. The lower level group of servers 920, 922 and 940 are dynamically created by their respective higher level servers 92 and 94 for carrying dual decor operations according to the present invention. All of the servers operate as root and therefore have super user privileges with access to any file within the host system 54. The NTD server 94 is designed to contain the functionality required to handle different types of terminals such as the network terminal driver described in U.S. Pat. No. 4,951,245 which issued on Aug. 21, 1990.

As described in detail her(m, both the servers 92 and 94 include mechanisms specifically designed for validating security at the user level in conjunction with the execution of dual decor commands and functions. As shown in FIG. 1b the lower level group of servers 920, 922 and 940, each include access control mechanisms used to validate security at the file level. In the case of server 940, host access control mechanisms are used.

As indicated in FIGS. 1a and 1b the EMCU 73, dynamic server handler 92 and NTD server 94, each have access to a data structure in the form of a user table (USRTBL) 96 which has been located in host space so as to be inaccessible to ES user application programs. As described herein in greater detail, the table 96 contains encrypted user descriptor information which is used for validating a user's identity according to the teachings of the present invention. The encryption ensures security in the event of a memory dump.

As indicated in FIG. 1b, the emulator executive level 68 further includes a plurality of pseudo devices drivers (PSDD) 74 for each input/output device or type of input/output device which is required to be emulated by host system 54. For example, the pseudo device drivers 74 will include PSDDs for terminals, disk drivers, tape drivers, displays and for certain communication devices.

For a more detailed discussion of other aspects of the SAQ 88, MQI block 84, PSDD 74 and other emulator components, reference may be made to the related patent application.

Operating System/Kernel Level

The operating system/kernel level 64 includes the standard mechanisms and components normally included within the host operating system. As shown, level 64 includes a kernel process manager component 70, a host user password file 700, a host crypt password service facility 702, Inode permission files storage 704 and a number of host kernel I/O services (KIOS) processes 66 for each pseudo device driver (PSDD) 74 which is to be emulated by the host system and for each of the servers 920 through 940 assigned to execute dual decor commands and functions. Since the components of the kernel level 64 are well known, they are only briefly described herein. The host user password file 700 is used for storing information identifying registered host users. This file is updated and maintained by the host operating system kernel process manager 70. A part of the information stored in the password file 700 is the user encrypted password generated using the one way crypt password service facility 702 invoked by the kernel process manager 70.

The Inode permission files storage contains entries listing the attributes and disk addresses of each file in the system. Each Inode entry contains information about the type, size, times, ownership and disk blocks in each inode. The directory structure in the host system uses entries, each of which contains just a file name and its Inode number. The attributes of an entry include references to access control lists (ACLs) defining the file's base and any extended permissions. The base permissions correspond to the traditional file access modes (i.e., read, write and execute/search) assigned to a file owner, file group and Other users. The extended permissions designate how the base permissions have been modified in terms of permitting, denying or specifying access modes for specific individuals, groups, or user and group combinations designated by user and group ids. For the purpose of the present invention, this arrangement can be considered conventional in design.

Additionally, in the preferred embodiment of host system 54, level 64 is assumed to contain the standard utility programs, shell, editors, compilers, etc. and libraries (e.g., I/O libraries, open, close) which are accessed in the host user mode. For further information regarding the use of such arrangements, reference may be made to publications of the IBM Corporation describing the AIX operating system.

DESCRIPTION OF OPERATION

With reference to the flow charts of FIGS. 2a through 3b, the set of dual decor commands and functions incorporated into the system 54 according to the teachings of the present invention will now be described. As diagrammatically illustrated in FIG. 1a dual decor commands and functions encompass new commands and extensions to existing commands of the emulated system command set. The commands include a file copy command (CPX), a shell command (XSH), and an enhanced version of an emulated system link command (LK).

The CPX command provides the ability to copy or transfer a file in either direction between the emulated system and the host system. The XSH command provides the ability to activate and deactivate host procedures through host system facilities by the execution of synchronous and asynchronous shell commands. The LK command provides the ability for emulated system application programs with access to different types of host files. These include text flies and host named pipes accessed to create interprocess communications between concurrently executed emulated and host systems application programs for enabling cooperative processing.

The formats of these commands are set forth in the Appendix and are also described in detail in the referenced related patent applications. It will be noted from the Appendix that enhanced or augmented emulated system commands, such as the different type of LK commands, each utilizes a predetermined variable such as an upper case x which is followed by a colon (i.e., "X:) to denote its dual decor aspects.

As denoted by the shaded boxes in FIG. 1a, the different components of block 28 have been augmented to accommodate the set of dual decor commands and functions. The listener module 280 has been augmented to incorporate a validation routine which is invoked when a user logs on the emulated system. This causes the operations of FIG. 2a to take place during ES user login.

Logon Procedure

Figure 2A:
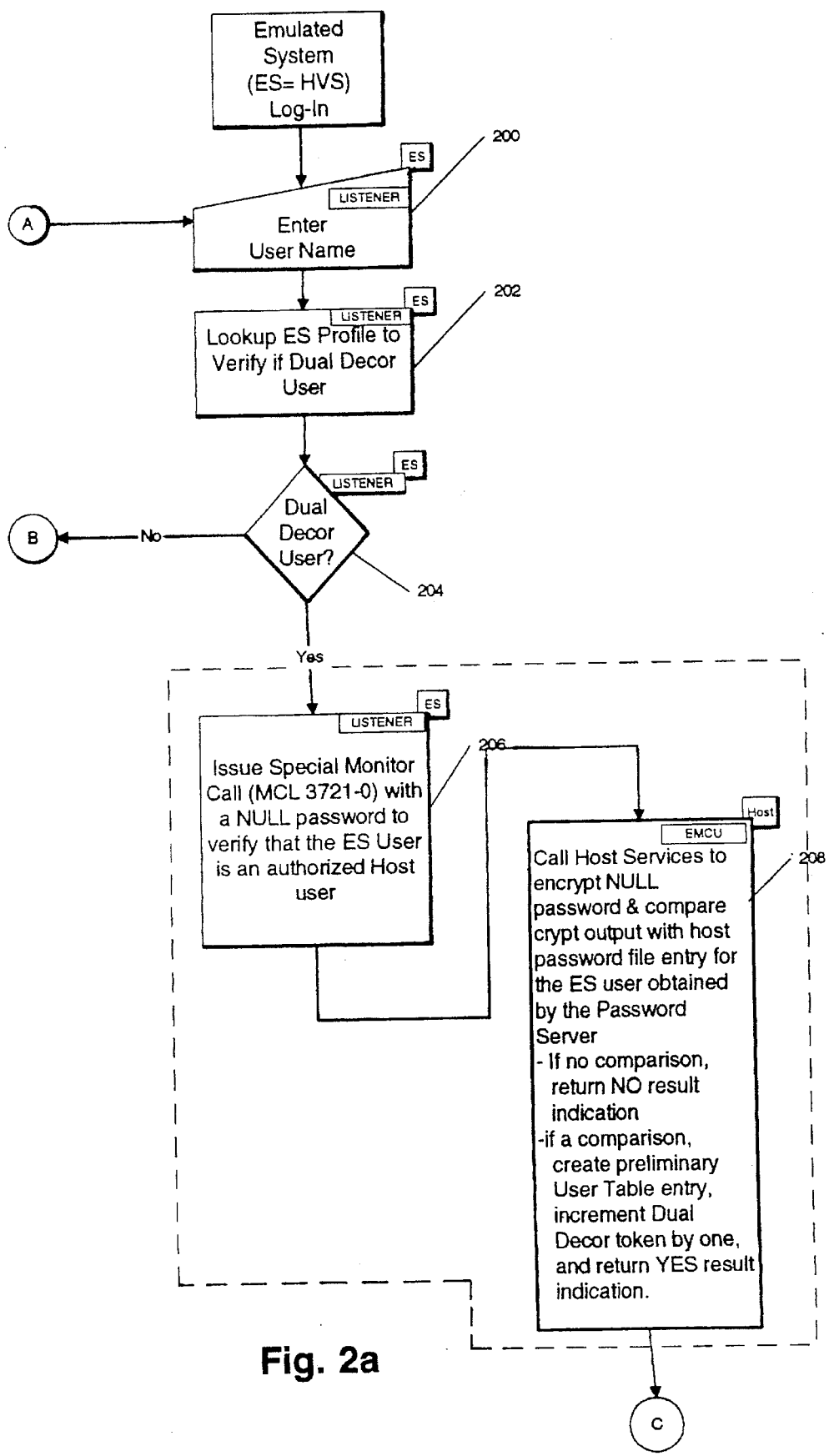
FIGS. 2a, 2b, 3a, and 3b are flow diagrams used in describing the operation of the present invention.

Referring to FIG. 2a, it is seen that listener module 280 first prompts the user to enter his or her name (i.e., user id) as in the case of a standard system login procedure (block 200). Next, the listener module 280 upon receipt of the user id, looks up the emulated system user profile to verify if the user is a dual decor user (block 202). More specifically, the emulated system like other systems maintains a user profile record for each authorized user of the system for security and accounting purposes. The profile record normally contains information such as the user-id, access restrictions, type of terminal, etc. As part of such access restrictions, the profile record includes a particular field coded for indicating if the user is a dual decor user. When the field is set to a predetermined value (i.e., a binary ONE), this indicates that the user is authorized to execute dual decor commands and functions.

If listener module 280 determines that the user is a dual decor user (block 204), it then takes the appropriate action to validate that the user is an authorized dual decor user which requires that the user is registered on the host system as an authorized host system user by the system administrator. This requires the ES user logging in to have the same login name (user_id) as the host system login name. This requirement is carried out by validating the user id as described herein. As indicated in FIG. 2a, the user_id is first tried to be validated with a NULL password (blocks 206 and 208). That is, listener module 280 issues a special monitor call (MCL 3721-0) accompanied with a NULL password. To ensure tight security, this type of monitor call can only be issued by listener module 280. The term validate as used herein refers to calling for the encryption of the password string and comparing the output of the crypt password service unit 702 corresponding to the encrypted password string with the host user entry obtained from the host user password file 700.

The special monitor call is received by EMCU 73 which has been augmented by additional routines, as denoted by the shaded block, to perform the requested validation operation. This is done through password server 90 which makes a series of system calls to the host operating system kernel. But, before doing that, as part of the monitor call, EMCU 73 performs a series of checks to authenticate that the call was in fact issued by listener module 280 and not by an impersonator. This includes checking that the listener module 280 is running in ring 0 (i.e., has the highest privilege) in addition to other kinds of checks such as verifying its group id. That is, since listener module 280 runs as a task within the emulated system, it has its own unique set of GCB and UCB data structures, which can be used in performing such checks. In this way, the system ensures that there is a trusted path to the host system by which the identity of the dual decor user can be validated.

The listener module 280 special monitor call invokes the password server 90 which in turn obtains the encrypted ES user password from the host user password file 700. Also, the special monitor call causes EMCU 73 to invoke the host crypt password service unit 702 to encrypt the NULL password and to compare the encrypted NULL password with the ES user password. If there is no comparison, then a no result is returned by EMCU 73 to the listener module 280. If there is a comparison, then a yes result is returned to listener module 280 by EMCU 73.

Figure 2B:
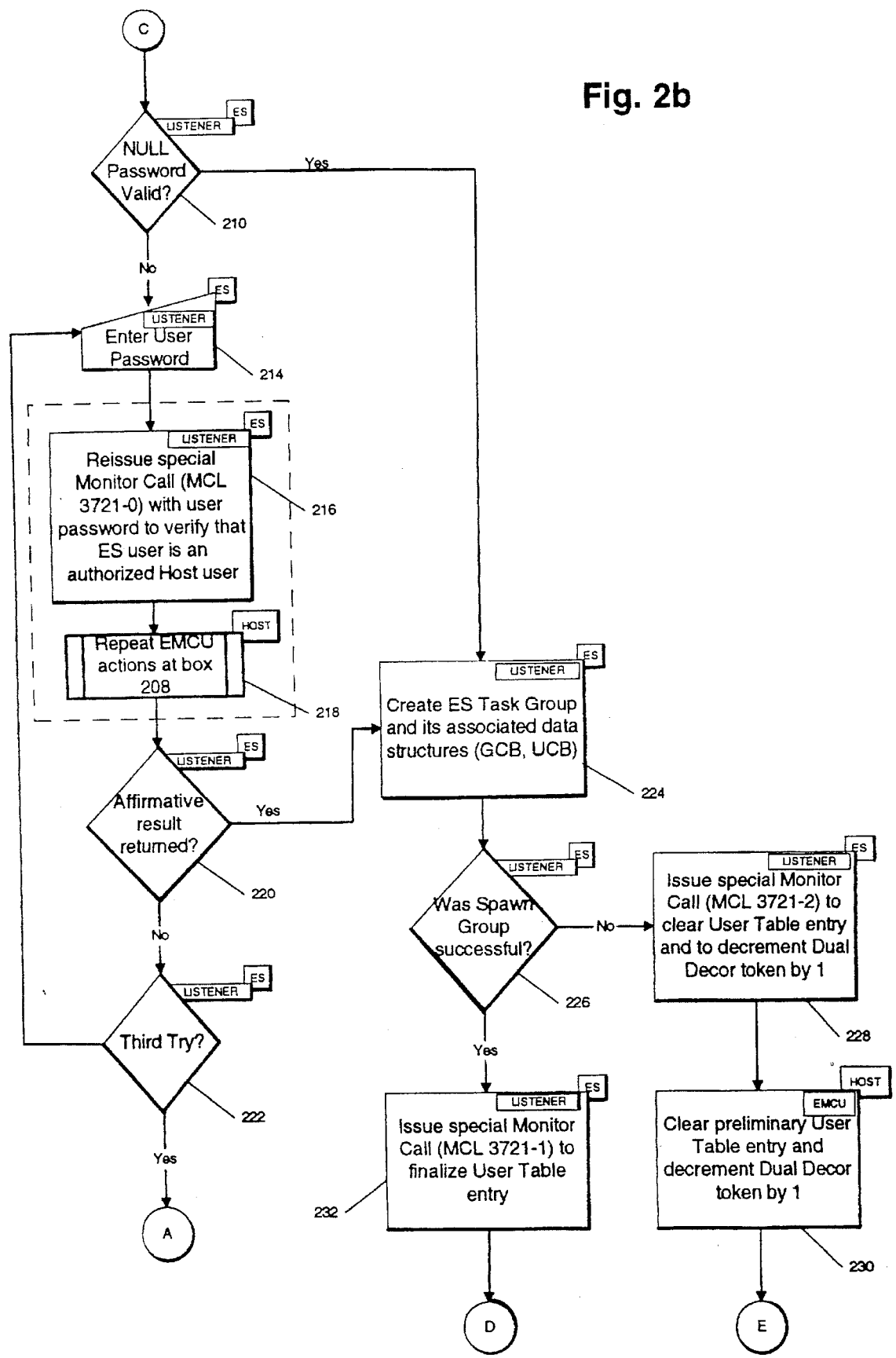

In the case of a comparison, EMCU 73 creates a preliminary user table entry within user table 96 which includes the listener control block address. It also increments by one, a dual decor token utilized for proper tracking of licenses. Next, as indicated in FIG. 2b, listener module 280 examines the returned result (block 210). When the response comes back that the NULL password was valid (block 210 or 220), the user need not be prompted for a password. If the response came back that the NULL password was not valid, listener module 280 then prompts the user for his or her password (block 214). Then, listener module 280 reissues the special monitor call along with the user entered password to determine if this password is valid (block 216).

As indicated in FIG. 2b, the operations of block 208 are repeated (block 218) and listener module 280 again examines the remit (block 220). That is, the password provided by the user is encrypted and the crypt output is compared with the host password file entry for the ES user obtained by the password server 90. If the response is that the user password was not valid, the listener module 280 again prompts the user for another password and reissues the special monitor call. This sequence is repeated three times (block 222). If the response is still the same after the third try, then listener module 280 discontinues the procedure and returns to the beginning of the login sequence.

If response came back that the password was valid, listener module 280 creates the emulated system task group and its associated GCB and UCB structures equivalent to the GCB and UCB structures of block 29 in FIG. 1a (block 224). Next, listener module 280 verifies that the create group request did not fail (i.e., the group was successfully spawned by the emulated system components) (block 226).

Figure 2C:
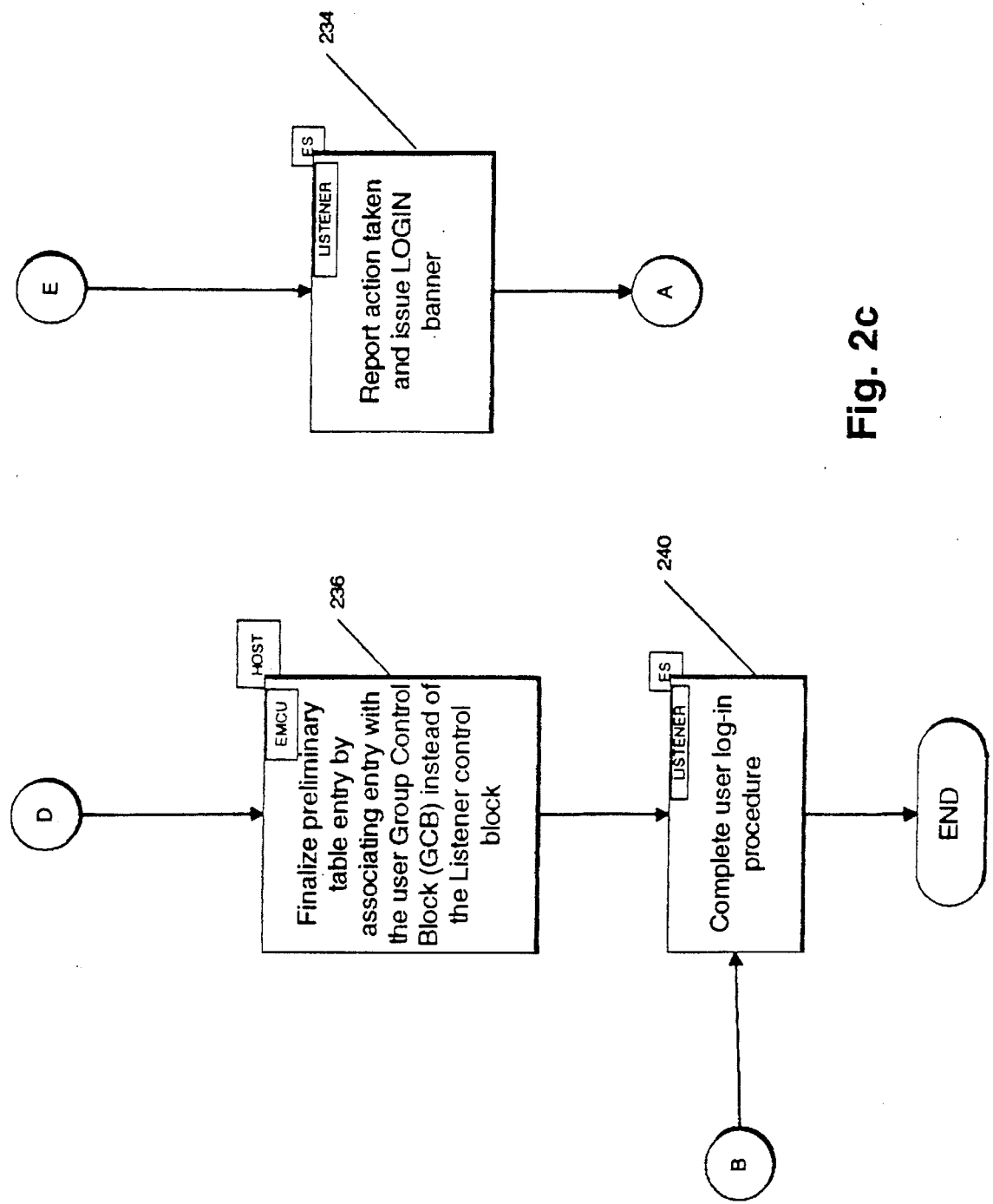

If for any reason the group could not be successfully spawned (e.g., insufficient memory available for that user), this event is detected and results in the listener module 280 issuing another type of the special monitor call (MCL 3721-2) to EMCU 73 (block 228). This results in the EMCU 73 clearing the preliminary user table entry within the user table 96 in addition to restoring the dual decor token to its previous value (block 230). As indicated in FIG. 2c, these operations are followed by listener module 280 reporting the action taken to the user and issuing an emulated system login banner followed by a return to the beginning of the login procedure (block 234).

When the listener module 280 verifies that the group was successfully created, then it issues another type of special monitor call (MCL 3721-1) to EMCU 73 (block 232). This causes EMCU 73 to finalize the preliminary table entry in user table 96 wherein the address of the GCB is changed from that of the listener module GCB to that of the user GCB (block 236). Next, listener module 280 completes the user login procedure (block 240).

The result of the login procedure is that the user table 96 now contains a unique description of the dual decor user (its personality) which the listener module 280 created for that user during the login procedure. More specifically, the description contains the user_id which is now associated with the addresses of that user's GCB and UCB data structures. Since it is not possible to change these addresses due to the way in which they are assigned by the emulated system, any change in user_id information would be readily detectable as a violation of the host system's trusted path established by its login procedure. Furthermore, the user description information is also encrypted further ensuring security in that it will not be discernible in the case of a memory dump.

Command Execution Flow

Figure 3A:
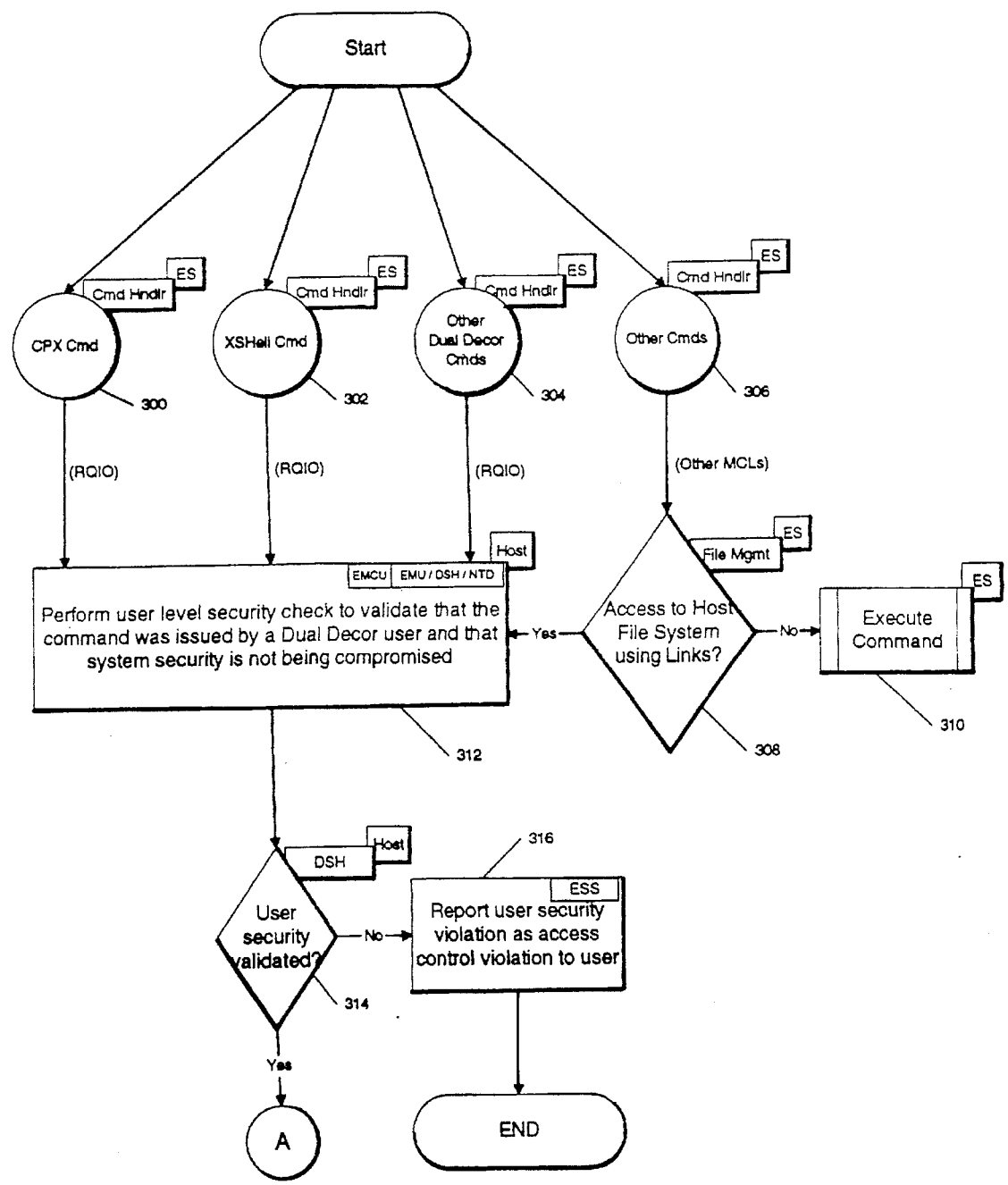
Figure 3B:
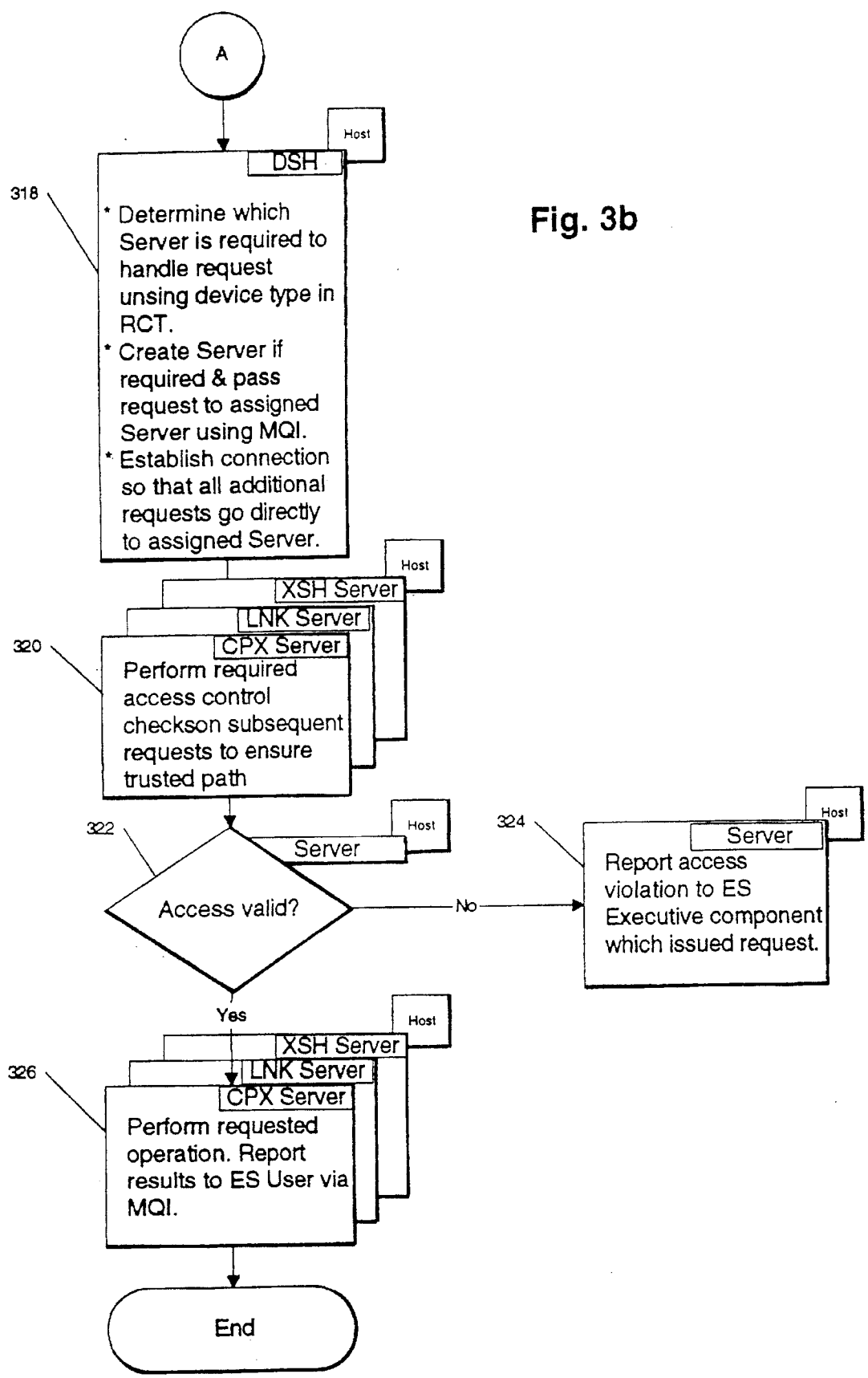

The present invention utilizes the unique user descriptions contained in user table 96 in carrying out security checks during the execution of commands issued by a user to prevent non-dual decor (unauthorized host) users from invoking such commands or functions. FIGS. 3a and 3b illustrate the user overall command execution flow. Referring to FIG. 3a, the circles labeled 300 through 306 represent the different kinds of commands which are available to a user. Of particular relevance to the present invention are the commands which are included as a part of the dual decor functionality.

As discussed above, the different components of block 28 have been augmented. More specifically, the file management component 282 has been modified to incorporate the necessary hooks and mechanisms which support each of the different types of LK commands. The command handler unit 284 has been augmented to include mechanisms which support the CPX and XSH commands in addition to certain aspects of the LK command.

During operation, when a command is issued by a user via a terminal device, the command invokes a command processor (not shown) included within block 28. The command processor is a system software component that reads each command line entered by the user through a terminal or form a command file and then passes it to the appropriate command handler within block 286 for execution.

In the case of certain types of dual decor commands and functions, the processing of a dual decor command causes the generation of a special monitor call by the particular command handler. This is done for the purpose of obtaining necessary resource identification information such as a logical resource number (LRN) value required for communicating with system tasks and devices. Thereafter, the command handler directly or indirectly causes the generation of a request for I/O monitor call (RQIO).

It will be noted that in the case of the link command, this command can be performed without invoking a dual decor function. That is, in the emulated system, any command can be used to establish a link within a directory or file without invoking dual decor functionability. It is only when the link mechanism is actually used to access host system files that the dual decor functionality may be invoked. Thus, as indicated in FIG. 3a, other monitor calls are examined by the file management component 284 to determine if access is being made to the host file system using link files or pipes (block 308). If it is, the file management component 284 issues a request for I/O monitor call. If no such access is being made, then the command is executed by the emulated system in the normal manner (block 310).

As seen from FIG. 3a, the RQIO monitor call to the EMCU 73 by each of the dual decor invoked components 28 results in a user level security check being performed by one of the high level servers 92 or 94 which is selected as a function of the type of dual decor command. In greater detail, in the case of certain types of dual decor functions (e.g., CPX command), the accompanying IORB data structure of RQIO monitor call includes information specifying the type of I/O operation requested and whether or not a host server process has been created to execute the operation. Assuming that no server process has been created as determined by the LRN value contained in the RCT entry, EMCU 73 transfers the request IORB by enqueuing it onto the MQI 84 queue section of either the dynamic server idler 92 in the case of CPX and XSH commands or onto the queue section of the NTD server 94 in the case of XSH commands.

Assuming that the request was forwarded to the dynamic server handler 92, in accordance with the present invention, DSH 92 performs the user level security check to validate that the command was issued by a trustworthy dual decor user ensuring that system security is not being compromised (block 312). More specifically, DSH 92 determines if the user is legitimately logged in with a valid host password. This is done by validating the user's personality by first obtaining the UCB and GCB addresses from shared memory for the user invoking the dual decor function through information stored in the IRB structure obtained from the TCB whose address is contained in the IORB. These addresses are compared against the encrypted addresses in the description entry for that user stored in the user table 96. This operation is carded out through the use of a common get user access control routine.

The user access routine causes encrypting of the current user descriptor information (i.e., user-id, GCB and UCB addresses) and a comparison of these three components of information with the encrypted information obtained from the user table 96. When there is no identical comparison in the case of all three fields, this indicates that the current user is not trustworthy and will compromise security. That is, the user access routine verifies that the GCB and UCB addresses associated with user id used during login have not changed.

If the user security can not be validated, DSH 92 takes no action to make a connection but simply reports the user level security violation to the user (block 316). Depending upon the type of dual decor command or operation, other actions may be taken by the executive component which initiated the request on behalf of the user. For example, in the case of the file management component 284, the task which attempted to do the operation may be killed. Since DSH 92 took no action to make the requested connection, the user has no way to carry out the dual decor command or function.

If the user security is validated (block 314), then DSH 92 opens the connection between the appropriate server and the executive service component which invoked the dual decor command or function on behalf of the user. More specifically, as indicated in FIG. 3b, it first determines which server is required to handle the request by referencing the device type information contained within the associated RCT. If no server of the type specified has been created or can be assigned, DSH 92 creates server process through the host fork system call mechanism and passes all of the information about the user to the server through MQI 84 (block 318). More specifically, the IORB is enqueued by DSH 92 onto the MQI queue assigned to the server which is to execute dual decor commands or functions. Next, DSH 92 establishes the connection between the assigned server and the user so that all future requests go directly to that server. This is done by modifying the RCT so that all subsequent requests will be directly sent to that server.

As indicated in FIG. 3b, the assigned server performs an access check at the file or directory level on the request (block 320). This is done by the server making a call to a get access function which by additional calls determines if the particular user id can perform the specific type of operation on a given file. The same common routine is used by each of the different types of servers to perform this type of access check.

The access check involves referencing the Inode permissions files 704 through system calls to kernel process manager 70. As indicated above, the Inode files 704 include file owner identifier information (i.e., individual owner and group owner and the sets of users who have access rights to the file) file type information (e.g. regular, directory, FIFO pipes) and file access permission information. This obtains all of the permissions at the particular user Inode and verifies whether or not the user has the required permissions. The result is that a three bit code is generated by the server for indicating read, write and execute permissions. When there is an access violation, this information is used in reporting the type of violation to the ES executive component which issued the request (blocks 320 and 324). As indicated in FIG. 3b, when the server determines that access is valid, then the server performs the specified dual decor command or function and reports the results to the ES user via MQI 84 (block 326).

The access check of block 320 takes place at "file access time" which in the host system is the first step a process must take to access the data in a host file. In the case of the host system open system call, there is information specifying the type of open (e.g. reading or writing). In the emulated system, a dual decor user can issue commands or functions which precede a logical connect of the host system operation which is equivalent to the open. For example, this is the case where the ES user reserves a file by issuing a get file command causing the file management system 282 to issue an RQIO in the form of a physical connect.

In this case, the DSH server performs the security operations of blocks 312 through 318 as described above. The assigned lower level server performs the access control check of block 320 also in the manner described above in response to the physical connect operation. But, since there is no way to determine the type of operation to be performed on the file, only the directory files are checked and it is determined that the user has sufficient permission to open the file. At the time when the logical connect (open) is issued indicating the type of operation at file access time, this request goes directly to the assigned server which performs an extensive permissions check which includes also verifying the user access permission through the basic and extended permissions. Any violation is signaled in the above manner.

The arrangement enables the access check of block 320 to be made specified or tailored as a function to the type of operation being performed to enforce the appropriate level security. The access check can therefore be performed on opens, reads or writes as required. Hence, tight security is maintained notwithstanding the type of dual decor command or function being extended. Further, performing access checking at this end enhances the security of the emulated systems wherein it was not always possible to determine the type of access being requested before an initial phase of the operation was allowed to take place.

From the above, it can be seen how the present invention processes dual decor commands and functions in a manner which maintains the level of tight security which is characteristic of the host system 54. It accomplishes it by integrating dual decor functions within the different executive services components of the emulated system and by adding special monitor calls and additional server facilities to the emulation executive level layer so as to have the host system operating system remain in tact.

-23-

APPENDICES

These Appendices include source listings which are subject to copyright protection. The copyright owner, Bull HN Information Systems Inc., has no objection to the facsimile reproduction by any one of the patent disclosure, as it appears in the Patent and Trademark Office patent files or records, but otherwise reserves all copyright rights in such listings whatsoever.

APPENDIX A - Dual Decor Components     Pages A-1 - A-19
APPENDIX B - Dual Decor Commands        Pages B-1 - B-3

Page A-1
APPENDIX A
DUAL DECOR COMPONENTS
```
****************************************************************************
  Emulated System Specialized Monitor Call Handlers
****************************************************************************
extern char    *base, *sys_r0, *usr_r0, *curr_asv, iyam[];
extern struct USRTBL *qhdu;
extern ulong   *ssdt_ptr;   /* pointer to subsdt */
extern char    *crypt();
extern unsigned int lrt_address;
extern unsigned short config_dual_decor_users;
extern unsigned short logged_on_dual_users;
extern char    *get_base_session_name();

/**************
* mcl_cpx_lrn  *   370f - Return unreserved dual decor lrn to CPX/XSH/etc.
**************/
void
mcl_cpx_lrn(rr)
struct RISC_REGS *rr;
{
   struct GCB     *gcb;
   struct LRT     *lrt;
   struct RCT     *rct;
   int            bu_id, oldmask, nodstat;
   char           xsh_pipe_name[MAXPATHLEN + 20], *session_id;

if (!(allowed("ddcor")))
   {
        rr->r1 = PRIV_VIOLATION;
        return;
   }
   if (!(bu_id = bound_unit(rr)))
   {
        rr->r1 = PRIV_VIOLATION;
        return;
   }
   if ((bu_id == NXSH_ID) && (rr->r2))
   {
        lrt = (struct LRT *) lrt_address;
        RISC_ADDR(rct, (struct RCT *), (lrt->rt_rct + rr->r2 * 2));
        rct = (struct RCT *) ((char *) rct - OFF_RCT);
        if (rct->qaddr.fildes[1])
        {
          close(rct->qaddr.fildes[1]);
          rct->qaddr.fildes[1] = 0;
        }                          /* pipe is open */
        rr->r1 = SUCCESS_CODE;
   }                               /* NXSH close pipe */
   else
   {
      if (rr->r2 = get_ddcor_rct(bu_id))
      {
        switch (bu_id)
        {
        case CPX_ID:
```

Page A-2

```
                    rr->rl = SUCCESS_CODE;
                    break;
                case NXSH_ID:
/* Get the Session's Instance Name */
                    session_id = get_base_session_name();
/* Set up the IORB Pipe Name */
                    sprintf(xsh_pipe_name, "%s.Nxsh_%d", session_id, rr->r2);
                    oldmask = umask(0);
                    do
                       nodstat = mknod(xsh_pipe_name,
                                    (S_IFIFO | S_IRWXU | S_IRWXG | S_IRWXO), 0);
                    while ((nodstat < 0) && (errno == EINTR));
                    umask(oldmask);   /* restore old mask */
                    if (nodstat < 0)
                    {
                       syslog(LOG_ERR, "E851: NXSH Unable to create pipe %s: %m",
                              xsh_pipe_name);
                       rr->rl = UNAVL_CODE;
                       break;
                    }
                    rr->rl = SUCCESS_CODE;
                    break;
                default:
                    rr->rl = PRIV_VIOLATION;
                    break;
            }                            /* switch */
        }
        else
        {
            rr->rl = UNAVL_CODE;
            syslog(LOG_ERR, "E744: DDECOR (%s) No available LRN", iyam);
        }
    }
}                                        /* mcl_cpx_lrn */

/***************
 * mcl_link_lrn *    3720 - Return LINK lrn
 ***************/
void
mcl_link_lrn(rr)
struct RISC_REGS *rr;
{
    struct HDM      *hdm_base;
    struct SCB      *scb;
    struct GCB      *gcb;
    struct LRT      *lrt;
    struct RCT      *rct;
    int             i;
    long            ssz;

if (!(allowed("ddcor")))
    {
        rr->rl = PRIV_VIOLATION;
        return;
    }
```

Page A-3

```c
    }
    hdm_base = (struct HDM *) sys_r0;
    RISC_ADDR(scb, (struct SCB *), hdm_base->h_scb);
    RISC_ADDR(ssz, (long), scb->s_ssz);
    if (MCLng(rr))
        return;
    if (rr->p >= ssz)
    {
        rr->r1 = ARG_NG;
        return;
    }
/*
* look for a free entry on the ddecor free queue
*/
    if (rr->r2 = get_ddcor_rct(LNK_ID))
    {
        rr->r1 = SUCCESS_CODE;
    }                           /* if available lnk */
    else
    {
        rr->r1 = UNAVL_CODE;
        syslog(LOG_ERR, "E745: LINK No available LRN");
    }
}                               /* mcl_link_lrn */

/*************
* mcl_login *   3721 - Listener login (ES to Host)
*************/
/*
* r2=0: Listener login :: b1 -> lrrb; b2 -> user profile; b3 -> password
* r2=1: Login level 2  :: b1 -> gcb; b7 -> lrrb
* r2=2: logout         :: b1 -> lrrb
* r2=3: Reconnect      :: same as 0 - except do not count dual decor users
*
* on return: r1=0 success; r1!=0 failure
*/
void
mcl_login(rr)
struct RISC_REGS *rr;
{
    static char    person[14], passwd[14], salt[3];
    static char    spaces[] = "              ";
    static struct USRTBL *usrptr, *qptr;
    static struct GCB *gcb;
    static struct TCB *tcb;
    static int     i;
    static char    *ptr;
    unsigned long  breg_addr;

if ((is_it_listener(rr)) && (allowed("ddcor")))
    {
        if ((logged_on_dual_users >= config_dual_decor_users) && (rr->r2 == 0))
        {
            rr->r1 = MAX_USERS;
```

Page A-4

```
    return;
}
get_acl_qhead();
switch (rr->r2)
{
case PRIM_LOGIN:
case RECONNECT:
case VALIDATE:
    TRANSL_RISC_BREG(ptr, (char *), rr->b2);
    memcpy(person, &ptr[6], 12);   /* ???? */
    person[12] = '\0';
    if (ptr = (strchr(person, ' ')))
    {
        *ptr = '\0';
    }
    else
    {
        if (ptr = (strchr(person, '.')))
            *ptr = '\0';
    }
    if (strlen(person) >= L_cuserid)
    {
        rr->r1 = 0x1204;   /* ????? */
        syslog(LOG_ERR, "E732: user name too long : %s", person);
        break;
    }
    for (i = 0; i < strlen(person); i++)
    {
        if (isupper(person[i]))
            person[i] = tolower(person[i]);
    }
    TRANSL_RISC_BREG(ptr, (char *), rr->b3);
    memcpy(passwd, ptr, 12);
    passwd[12] = '\0';
    if (ptr = (strchr(passwd, ' ')))
        *ptr = '\0';
    breg_addr = rr->b1;
    switch (chkpass(person, passwd))
    {
    case 0:
        rr->r1 = 0;
        break;
    case ENOENT:
        rr->r1 = NOT_REGISTERED;
        break;
    case EACCES:
        rr->r1 = INVALID_PW;
        break;
    default:
        rr->r1 = -1;
        break;
    }                  /* switch */
    if ((rr->r1 != 0) || (rr->r2 == VALIDATE))
        break;
```

Page A-5

```c
            lock(qhdu->uq.prio1);
            if (rr->r2 == PRIM_LOGIN)
            {
                    usrptr = (struct USRTBL *) lnk_dqh((struct LQHEAD *) qhdu,
                                                    AVAIL_Q);
                    if (usrptr == 0)
                    {
                      unlock(qhdu->uq.prio1);
                      syslog(LOG_ERR, "E677: user queue full!");
                      rr->r1 = 1;
                      break;
                    }
                    salt_it(salt);
                    ptr = crypt(person, salt);
                    strcpy(usrptr->crypt1, ptr);
                    if (strlen(person) > 8)
                        ptr = crypt(&person[8], salt);
                    strcpy(usrptr->crypt2, ptr);
                    usrptr->ltrb = breg_addr;
                    lnk_qoh((struct LQHEAD *) qhdu, (struct LQHEAD *) usrptr,
                            breg_addr);
                    unlock(qhdu->uq.prio1);
                    rr->r1 = 0;
                    logged_on_dual_users++;
                    break;
            }                           /* Listener connect */
/* this is a reconnect request - password is valid - insure entry in table */
            breg_addr = rr->b1;
            qptr = qhdu;
            for (;;)
            {
                    qptr = (struct USRTBL *) qptr->uq.fwd;
                    if (qptr->uq.fwd == (unsigned long) qhdu)
                    {
                      qptr = 0;
                      break;
                    }
                    if (qptr->ltrb == breg_addr)
                        break;
            }                           /* for */
            if (qptr == 0)
            {
                    rr->r1 = 1;
                    syslog(LOG_ERR, "E765: Reconnect failure for user %s", person);
/* we are out of sync with Listener - dual decor user count may be wrong */
            }
            else
            {
                    rr->r1 = 0;
            }
            unlock(qhdu->uq.prio1);
            break;
         case SECND_LOGIN:
            breg_addr = rr->b7;
```

Page A-6

```c
lock(qhdu->uq.prio1);
usrptr = (struct USRTBL *) lnk_dqh((struct LQHEAD *) qhdu,
                                   breg_addr);
if (usrptr == 0)
{
    breg_addr = rr->b7;
    qptr = qhdu;
    for (;;)
    {
        qptr = (struct USRTBL *) qptr->uq.fwd;
        if (qptr->uq.fwd == (unsigned long) qhdu)
        {
            qptr = 0;
            break;
        }
        if (qptr->ltrb == breg_addr)
        {
            break;
        }
    }                   /* for */
    if (qptr == 0)
    {
        unlock(qhdu->uq.prio1);
        rr->r1 = 1;
        syslog(LOG_ERR, "E766: Secondary level login failure");
        if (logged_on_dual_users)
                logged_on_dual_users--;
        else
                syslog(LOG_ERR, "E891: ddcor user count corrupted");
        break;
    }
    else
    {
        unlock(qhdu->uq.prio1);
        rr->r1 = 0;
        break;
    }
}
TRANSL_RISC_BREG(gcb, (struct GCB *), rr->b1);
RISC_ADDR(tcb, (struct TCB *), gcb->g_ltcb);
tcb = (struct TCB *) ((char *) tcb - OFF_TCB);
RISC_ADDR(breg_addr, (unsigned long), tcb->t_uchp);
sprintf(person, "%x", gcb);
ptr = crypt(person, usrptr->crypt1);
strcpy(usrptr->crypt3, ptr);
lnk_qoh((struct LQHEAD *) qhdu, (struct LQHEAD *) usrptr,
        breg_addr);
rr->r1 = 0;
unlock(qhdu->uq.prio1);
break;
case LOGOUT:
    breg_addr = rr->b1;
    lock(qhdu->uq.prio1);
    qptr = qhdu;
```

Page A-7

```
            for (;;)
            {
                    qptr = (struct USRTBL *) qptr->uq.fwd;
                    if (qptr->uq.fwd == (unsigned long) qhdu)
                    {
                       qptr = 0;
                       break;
                    }
                    if (qptr->ltrb == breg_addr)
                            break;
            }                          /* for */
            if (qptr == 0)
            {
                    unlock(qhdu->uq.prio1);
                    rr->r1 = 1;
                    syslog(LOG_ERR, "E767: Dual Decor logoff failure");
/* we are out of sync with Listener - dual decor user count may be wrong */
                    break;
            }
            lnk_dqa((struct LQHEAD *) qptr);
            usrptr = qptr;
            strcpy(usrptr->crypt1, spaces);
            strcpy(usrptr->crypt2, spaces);
            strcpy(usrptr->crypt3, spaces);
            usrptr->ltrb = 0;
            lnk_qoh((struct LQHEAD *) qhdu, (struct LQHEAD *) qptr, AVAIL_Q);
            rr->r1 = 0;
            if (logged_on_dual_users)
                    logged_on_dual_users--;
            else
                    syslog(LOG_ERR, "E892: ddcor user count corrupted");
            unlock(qhdu->uq.prio1);
            break;
         default:
/*          syslog(LOG_DEBUG, "Login invalid parameter R2 = %04x", rr->r2);*/
            rr->r1 = 1;
            break;
         }                             /* switch r2 */
   }                                   /* if listener */
   else
         rr->r1 = PRIV_VIOLATION;
}                                      /* mcl_login */

/***************
 * mcl_sock_lrn *    3727 - Return SOCK lrn
 ***************/
void
mcl_sock_lrn(rr)
struct RISC_REGS *rr;
{
   struct HDM     *hdm_base;
   struct SCB     *scb;
   struct GCB     *gcb;
   struct LRT     *lrt;
```

Page A-6

```
    struct RCT    *rct;
    int        i;
    long       ssz;

hdm_base = (struct HDM *) sys_r0;
    RISC_ADDR(scb, (struct SCB *), hdm_base->b_scb);
    RISC_ADDR(ssz, (long), scb->s_ssz);
    if (MCLng(rr))                  /* check you are in ring 0 */
        return;
/*
* look for a free entry on the ddecor free queue
*/
    if (rr->r2 = get_ddcor_rct(SOCK_ID))
    {
        rr->r1 = SUCCESS_CODE;
    }                               /* if available lnk */
    else
    {
        rr->r1 = UNAVL_CODE;
        syslog(LOG_ERR, "E1181: SOCK No available LRN");
    }
}                                   /* mcl_sock_lrn */
```

Page A-9

```
*************************************************************************
    Host System Security Verification Routines
*************************************************************************
    static int
    getgrouplist(char *user);
    static void
    setresult(int *result, int scantype, int access);
    int
    user_access(char *object, char *username);
    static int
    getaclinfo(int scantype, struct acl * aclbuffer, struct stat * statbuff);
    int
    get_access(char *, char[], int);
    int
    get_user(struct IRB *, struct LRB *, char[]);
    void
    get_acl_qhead(void);
    int
    chkpass(char *, char *);
    void
    salt_it(char *);

struct HDM    *hdm_base;
    struct SCB    *scb;
    struct MQI    *saq;
    struct MQI    *pswd_in, *pswd_out;
    struct PSWD_Q *pswd_queue;
    struct USRTBL *qhdu;
    char          group_path[MAXPATHLEN + 1];
    int           Uid;

extern int    virt_view, dps6_uvah;
    extern char   *base, *sys_r0;

static gid_t  Gidsetsize, Gidset[NGROUPS_MAX];
    static char   *accesses[] = {"---", "--x", "-w-", "-wx",
                                 "r--", "r-x", "rw-", "rwx"};

static int
    is_in_group(gid_t groupid);

extern char   *crypt();

/***************
 * getgrouplist *
 ***************/
    static int
    getgrouplist(char *user)
    {
       int           rc;
       struct passwd *pwent;

pwent = getpwnam(user);
       if (pwent == NULL)
```

Page A-10

```
        return (-1);
Uid = pwent->pw_uid;
if (initgroups(user, pwent->pw_gid) != 0)
        return (-1);
Gidsetsize = rc = getgroups(sizeof(Gidset) / sizeof(gid_t), Gidset);
/*  syslog(LOG_INFO, "1363: Groupset was %d members", Gidsetsize); */
if (rc == -1)
        return (-1);
else
        return (0);
}                               /* getgrouplist */

/************
* setresult *
************/
static void
setresult(int *result, int scantype, int access)
{
   access &= 07;
   switch (scantype)
   {
   case ACC_PERMIT:
        *result |= access;
        break;
   case ACC_SPECIFY:
        *result = access;
        break;
   case ACC_DENY:
        *result &= ~access;
        break;
   }
}                               /* setresult */

/**************
* user_access *
**************/
int
user_access(char *object, char *username)
{
   int         rc, ACLSize, sizeok;
   struct acl  *aclbuffer;
   int         finalaccess;
   struct stat statbuffer;

finalaccess = 0;
   ACLSize = ACL_SIZ;           /* normal size */
   aclbuffer = (struct acl *) malloc(ACLSize);
   if (aclbuffer == NULL)
   {
        return (finalaccess);
   }                            /* NULL buffer */
   do
   {
        sizeok = 0;
```

Page A-11

```
            rc = statacl(object, STX_NORMAL, aclbuffer, ACLSize);
            if (rc != 0 && errno == ENOSPC)
            {
                sizeok = 1;
                ACLSize = *(int *) aclbuffer;
                free(aclbuffer);
                aclbuffer = malloc(ACLSize);
                if (aclbuffer == NULL)
                {
                    return (finalaccess);
                }
            }
        }
        while (sizeok != 0);
        if (rc == 0)
        {
            int         thisaccess;

/*          syslog(LOG_INFO, "I364: User is %s", username);*/
            rc = stat(object, &statbuffer);
            if (rc != 0 || getgrouplist(username) != 0)
            {
                free(aclbuffer);
                return (finalaccess);
            }
            thisaccess = getaclinfo(ACC_PERMIT, aclbuffer, &statbuffer);
/*          syslog(LOG_INFO, "I365: Scan for permit results: %o", thisaccess);*/
            setresult(&finalaccess, ACC_PERMIT, thisaccess);

thisaccess = getaclinfo(ACC_SPECIFY, aclbuffer, &statbuffer);
/*          syslog(LOG_INFO, "I366: Scan for specify results: %o", thisaccess);*/
            if ((thisaccess & 010) == 0)
                setresult(&finalaccess, ACC_SPECIFY, thisaccess);

thisaccess = getaclinfo(ACC_DENY, aclbuffer, &statbuffer);
/*          syslog(LOG_INFO, "I367: Scan for deny results: %o", thisaccess);*/
            setresult(&finalaccess, ACC_DENY, -thisaccess);
        }
        free(aclbuffer);
        return (finalaccess);
}                                       /* user_access */

/*************
* is_in_group *
*************/
static int
is_in_group(gid_t groupid)
{
    int         i;

for (i = 0; i < Gidsetsize; i++)
        if (Gidset[i] == groupid)
            return (1);
    return (0);
```

Page A-12

```
}                               /* is_in_group */

/*************
* getaclinfo *
*************/
static int
getaclinfo(int scantype, struct acl * aclbuffer, struct stat * statbuff)
{
    int        gobbled;
    int        result;
    struct acl_entry *aep;
    struct ace_id   *aip;

switch (scantype)
    {
    case ACC_PERMIT:
            result = aclbuffer->o_access;
            if (is_in_group(statbuff->st_gid))
               result = aclbuffer->g_access;
            if (Uid == statbuff->st_uid)
               result = aclbuffer->u_access;
            break;
    case ACC_SPECIFY:
            result = 010;
            break;
    case ACC_DENY:
            result = 7;
            break;
    }
/*    syslog(LOG_INFO, "I368: acl_len=%d,u=%o,g=%o,o=%o",
            aclbuffer->acl_len,
            aclbuffer->u_access,
            aclbuffer->g_access,
            aclbuffer->o_access);*/
    gobbled = ACL_SIZ;
    aep = &aclbuffer->acl_ext[0];
    while (aclbuffer->acl_len > gobbled)
    {
            int        nibbled;
            int        userseen;
            int        thisisone;

thisisone = 1;
            if (aep->ace_type != scantype)
            {
              gobbled += aep->ace_len;
              aep = (struct acl_entry *) ((char *) aclbuffer + gobbled);
              continue;
            }
/*          syslog(LOG_INFO, "I369: ace_len=%d,%o,%s",
                aep->ace_len,
                aep->ace_access,
                (aep->ace_type == ACC_DENY) ? "deny" :
                ((aep->ace_type == ACC_PERMIT) ? "permit" : "specify"));*/
```

Page A-13

```
            gobbled += ACE_SIZ;
            nibbled = ACE_SIZ;
            aip = &aep->ace_id[0];
            userseen = 0;
            while (aep->ace_len > nibbled)
            {
               int      idno;

if (aip->id_type == ACEID_USER)
                    userseen++;
/*             syslog(LOG_INFO, "I370: %s:",
                    (aip->id_type == ACEID_USER) ? "u" : "g");*/
               for (idno = 0; idno < (aip->id_len - ID_SIZ)
                    / sizeof(aip->id_data); idno++)
/*                  syslog(LOG_INFO, "I371: %ld", aip->id_data[0]);*/
                    if (aip->id_type == ACEID_USER && Uid != aip->id_data[0])
                        thisisone = 0;
               if (aip->id_type == ACEID_GROUP
                    && is_in_group(aip->id_data[0]) == 0)
                        thisisone = 0;
               gobbled += aip->id_len;
               nibbled += aip->id_len;
               aip = (struct ace_id *) ((char *) aep + nibbled);
            }
            if (userseen > 1)
            {
               thisisone = 0;
/*             syslog(LOG_INFO, "I372: Invalid - more than one user");*/
            }
            if (thisisone)
                setresult(&result, scantype, aep->ace_access);
            aep = (struct acl_entry *) ((char *) aclbuffer + gobbled);
      }
      return (result);
}                                       /* get_acl_info */

/************
 * get_access *
 ************/
int
get_access(char *pp, char person[], int type)
{
   int       i;
   char      *path, replaced;
   char      cmnd[128];
   int       access, dirfail;
   path = pp;
   access = 01;
   dirfail = 0;
   do
   {
        if (access & 01)
        {
            replaced = *(++pp);
```

Page A-14

```
            *pp = 0;
            access = user_access(path, person);
            *pp = replaced;
            pp = strchr(pp, '/');
        }
        else
        {
            pp = NULL;
            dirfail = 1;
        }
    } while (pp && *pp);
    if (dirfail == 0 && path[strlen(path) - 1] != '/')
    {
        if (type == LK_FILE)
            access = user_access(path, person);
    } if (dirfail)
            access = -1;
    return (access);
}                               /* get_access */

/**********
 * get_user *
 **********/
/*
 * validate user as "trusted" (by group-id) or having a Host pseudo-login
 */
int
get_user(struct IRB * irb, struct LRB * iorb, char *person)
{
    struct UCB      *ucb;
    struct LQHEAD   *prev;
    char            temp[130];
    struct USRTBL   *unxt;
    struct GCB      *gcb;
    struct TCB      *tcb;
    struct FCB      *fcb;
    struct FDB      *fdb;
    static int      groups, end_of_string, i, count;
    static char     *bytes_tran;
    char            group_id[130], account[130], grp_buff[130];

/*
 * if this is a Listener logged in user check USRTBL. for other groups
 * check the GROUPS file (if it exists) to establish the group to Uid
 * association. an entry in the file of the form "ID *" associates the
 * group ID to whatever user is specified in the UCB. entries of the form
 * "ID HOST-user" override any userid specified in the UCB - Host-user is
 * always used. the GROUPS file is never checked for Listener users.
 * note: if a group doesn't have a lead task, reject it (as far as we
 * know, this only applies to $S, since all other groups should have
 * lead tasks).
 */
```

Page A-15

```
RISC_ADDR(gcb, (struct GCB *), irb->i_gcb);
RISC_ADDR(tcb, (struct TCB *), gcb->g_ltcb);
if ((gcb->g_ltcb[0] | gcb->g_ltcb[1]) == 0)
{
        syslog(LOG_INFO, "I631: access denied for SS task group");
        return 0;
}
tcb = (struct TCB *) ((char *) tcb - OFF_TCB);
RISC_ADDR(fcb, (struct FCB *), tcb->t_iuip);
RISC_ADDR(fdb, (struct FDB *), fcb->c_fdbp);
if (fdb->d_ind2 & md_lsn)
{
        RISC_ADDR(ucb, (struct UCB *), tcb->t_ucbp);
        lock(qhdu->uq.prio1);
        unxt = (struct USRTBL *) lnk_findq((struct LQHEAD *) qhdu, ucb, &prev);
        if (strlen(person) > 8)
           i = 8;
        else
           i = 0;
        sprintf(temp, "%x", gcb);
        if (!(unxt))
        {
            syslog(LOG_INFO,
                    "I497: access denied for %s: user not registered", person);
            unlock(qhdu->uq.prio1);
            return (0);              /* user not Host registered */
        }
        if ((strcmp(crypt(person, unxt->crypt1), unxt->crypt1) != 0)
           || (strcmp(crypt(&person[i], unxt->crypt2), unxt->crypt2) != 0)
           || (strcmp(crypt(temp, unxt->crypt3), unxt->crypt3) != 0))
        {
            syslog(LOG_INFO,
                    "I498: access denied for %s: user name changed", person);
            unlock(qhdu->uq.prio1);
            return (0);
        }
        unlock(qhdu->uq.prio1);
        return (1);                  /* appears valid */
} if (group_path[0] != 0)
{
    do
       groups = (int) fopen(group_path, "r");
    while ((groups < 0) && (errno == EINTR));
    if (groups < 0)
       return (0);
    i = 0;
    for (;;)
    {
       do
       {
            errno = 0;
```

Page A-16

```
                bytes_tran = fgets(grp_buff, 129, (FILE *) groups);
        }
        while ((bytes_tran == NULL) && (errno == EINTR));
        if (bytes_tran == NULL)
                break;
        end_of_string = strcspn(grp_buff, "\n");
        if (!(end_of_string))
                continue;           /* skip null lines */
        if (grp_buff[0] == '*')
                continue;           /* skip comments */
        grp_buff[end_of_string] = '\0';
        if ((count = sscanf(grp_buff, "%s%s%130c",
                                        group_id, account, temp)) > 0)
        {
                if ((strlen(group_id) != 2) || (strcmp(group_id, "SL") == 0)
                    || (strcmp(group_id, "SS") == 0) || (count < 2)
                    || (strlen(account) > 12))
                {
                    syslog(LOG_ERR,
                            "E658: Invalid GROUP entry : %s", grp_buff);
                    continue;
                }
                if (memcmp(group_id, &gcb->g_name, 2) == 0)
                {
                    if (strcmp(account, "*") == 0)
                    {
                        i = 1;
                        break;
                    }
                    strcpy(person, account);
                    for (i = 0; i < strlen(person); i++)
                    {
                        if (isupper(person[i]))
                            person[i] = tolower(person[i]);
                    }
                    i = 1;
                    break;
                }
            }
        }                           /* for */
        fclose((FILE *) groups);
        if (!(i))
            syslog(LOG_INFO,
                    "I499: access denied for %s: user not registered", person);
        return (i);
    }
    syslog(LOG_INFO,
            "I500: access denied for %s: user not registered", person);
    return (0);
}                                   /* get_user */

/***************
 * get_acl_qhead *
 ***************/
```

Page A-17

```c
/*
 * set up queue header pointer for logged on users (qhdu)
 */
void
get_acl_qhead(void)
{
   hdm_base = (struct HDM *) sys_r0;
   base = sys_r0;
   RISC_ADDR(scb, (struct SCB *), hdm_base->h_scb);
   RISC_ADDR(saq, (struct MQI *), scb->s_saq);
   qhdu = (struct USRTBL *) (saq + 1);
   return;
}                               /* get_acl_qheads */

/*********
 * chkpass *
 **********/ int
chkpass(char *user, char *passwd)
{ strcpy(pswd_queue->user, user);
   strcpy(pswd_queue->passwd, passwd);
   mqi_qot(pswd_out, (struct MQI_LINKS *) pswd_queue);
   pswd_queue = (struct PSWD_Q *) mqi_dqh(pswd_in);

return (pswd_queue->valid);
}                               /* chkpass */

/*********
 * salt_it *
 **********/
/*
 * create a random "salt" for crypt - upper and lower alpha only
 */
void
salt_it(char *salt)
{
   int          t, r;

t = time(0);
   r = t % 52;
   if (r > 25)
           salt[0] = 'a' + r - 26;
   else
           salt[0] = 'A' + r;
   r = (((t + r) / 11) * 7) % 52;
   if (r > 25)
           salt[1] = 'a' + r - 26;
   else
           salt[1] = 'A' + r;
   salt[2] = '\0';
   return;
```

}                    /* salt_it */

Page A-18

Page A-19

```
***************************************************************************
    Special User Table Structure Templates
***************************************************************************
struct LQHEAD
{
/* Note that in a header prio1 may be a semaphore */
        unsigned long  prio1;   /* qhdr/qfrm priority */
        unsigned long  fwd;     /* qhdr/qfrm forward link */
        unsigned long  bwd;     /* qhdr/qfrm backward link */
};

struct USRTBL
{
   struct LQHEAD uq;       /* uses UCB or LTRB address for priority */
   unsigned long ltrb;
   char      crypt1[14];
   char      crypt2[14];
   char      crypt3[14];
};

struct PSWD_Q
{
   struct MQI_LINKS pswd_mqi;
   int valid;
   char user[14];
   char passwd[14];
};
```

Page B-1

APPENDIX B

DUAL DECOR COMMANDS

1. The CPX command is a dual decor command which copies files between the emulated system and host system. The CPX Command Format is as follows:

CPX source_pathname destination_pathname [ctl_args]

Arguments:
source_pathname

This argument corresponds to the pathname of the file to be copied. Host pathnames must be enclosed in double quotes, must be complete pathnames and must start with x: or X:. If the pathname does not start with x:, it is assumed to be an emulated system file.

destination_pathname

This argument corresponds to the pathname of the file that is to be copied to. The same applies to the naming of pathnames.

ctl_args

None or any of the following control arguments may be used:

-BINARY | -B | -TEXT | -T to specify whether the file being copied is copied as a binary file or a text file.

-CLONE clone_pathname | -SEQ | -S_R

Sets file attributes of a file being created on an emulated system by using one of the three options.

-CLONE clone_pathname | -C clone_pathname

Creates a file using the attributes of the emulated system file specified by clone_pathname.

-SEQ

Creates an emulated system UFAS sequential file with 512 byte sectors.

-S_R

Creates an emulated system UFAS string-relative file with 512 byte sectors.

Default: -S_R (string relative).

Page B-2

-DELETE | -DL

Deletes the source file after the copy is complete.

-LIST | -LS

Issues confirmation messages.

2. The LK command is a dual decor command which creates links between emulated system files and host files or creates links to named pipes. The LK Command Format is as follows:

LK GCOSNAME "X:xpath" [ -BINARY | -TEXT] [-FILE | -PIPE]

Arguments:

-BINARY | -BIN | -B | -TEXT | -TXT | -T

Specifies whether the pipe or link being created is a binary pipe or link or a text pipe or line.
Default: Binary file.

xpath

Designates a host pathname for the link.

-FILE

Specifies a link to a file. Do not use with -PIPE.

GCOSNAME

Designates the emulated system name of the link.

-PIPE

Specifies a named pipe. Do not us with -FILE.

Page B-3

3. The XSH command is a dual decor command which allows a user to run host commands from an emulated system terminal. The XSH Command Format is as follows:

XSH ["xcommand [&]"]

Arguments:
"xcommand[&]"
    Designates a host command that user wants to execute.
    &
    Designates running command in background (asynchronously).

It will be apparent to those skilled in the art that many changes may be made to the preferred embodiment of the present invention.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A host system having a memory organized into shared and host memory areas and a hardware platform including a plurality of input/output devices operatively connected for executing host system instructions and for emulating the execution of emulated system instructions by an emulator running as an application process on said host system, said emulator including a number of emulated system executive service components operating in said shared memory area comprising a listener module and a command handler unit operatively coupled together and an interpreter, an emulator monitor call unit (EMCU) and server facilities operating in said host memory area, said host system further including operating system facilities for providing a number of services for host programs, said operating system facilities being coupled to said plurality of input/output devices and to said EMCU, said host system further including validation means for allowing only trusted emulated system users to access host system facilities through a predetermined set of dual decor commands, said validation means comprising:

user identity validation means included in said listener module, said user validation means in response to each emulated system user initiated login procedure verifying that the user has been given access to host facilities by generating a special monitor call for causing said EMCU to invoke predetermined ones of said host services for validating that the user is an authorized host system user and for causing the generation of a unique user description entry for each validated user to perform subsequent user level validations of said each emulated system user identity;

a user table (USTBL) mechanism located in said host memory area, said USTBL mechanism having a number of locations for storing said unique user description entry generated by said EMCU; and, said server facilities including first server handler means including user security validation means, said user security validation means in response to each input/output request generated by said command handler means in response to an emulated system user requesting access to said host facilities through one of said predetermined set of dual decor commands, performing a validation operation on said emulated system user by accessing said user table mechanism entry associated with said user requesting access to ascertain that said dual decor command was issued by a trusted user and would not compromise host system security and said first server handler means enabling execution of dual decor commands only when said validation operation confirms that the dual decor command was issued by a trusted user.

2. The host system of claim 1 wherein each unique user description entry includes emulated system descriptive information associated with the user by said executive service components which is not modifiable by the user.

3. The host system of claim 2 wherein said emulated system user descriptive information used to perform said validation operation includes a first portion containing user-id information and second and third portions containing addresses of predetermined data structures used by the executive service components to uniquely identify the user.

4. The host system of claim 3 wherein said first server handler means performs said validation operation by comparing the portions of said emulated system user descriptive information previously stored in said user table mechanism as an entry for the user with corresponding portions of emulated system user descriptive information obtained from said emulated memory area obtained by said first server handler which is associated with a current user invoking said host system facilities.

5. The host system of claim 4 wherein said first server handler means upon determining that there is no identical comparison indicating that the current user is untrustworthy, signals the occurrence of a user security violation and does not initiate a series of operations for enabling execution of the input/output request.

6. The host system of claim 4 wherein said first server handler means upon determining that there is an identical comparison identifying no change in user personality confirming that the current user is trustworthy, initiates a series of operations for enabling execution of the input/output request.

7. The host system of claim 1 wherein said EMCU includes means for validating that said listener module is the source of said special monitor call.

8. The host system of claim 6 wherein said first server handler means includes means for determining which type of server is required to handle the input/output request and means for assigning second lower level server means for handling the request as operations of the series of operations.

9. The host system of claim 8 wherein said means for assigning operates to dynamically creates and assigns servers according to a predetermined criteria.

10. The host system of claim 8 wherein said second lower level server means includes access control means for performing an access control check for establishing that said user has the required access permissions to perform the input/output request using host facilities.

11. The host system of claim 10 wherein said first server handler means further includes means for establishing connection between the assigned second lower level server means and the current user so that all subsequent input/output requests go directly to the assigned second lower level server as part of the series of operations following validation of access by said access control means.

12. The host system of claim 11 wherein said second lower level server means performs said validation of access permissions by said access control means at a time when access is to take place.

13. The host system of claim 8 wherein said operating system includes Inode permission files defining access permissions for each file of said host system, said access control means generating a number of system calls to said operating system for validating user access on the basis of both basic and extended permissions defined by said Inode permission files.

14. The host system of claim 1 wherein said predetermined set of dual decor commands includes both new and extensions to commands utilized by said emulated system.

15. The host system of claim 1 wherein said predetermined set of dual decor commands define a set of basic dual decor functions which are required for integrating both said host and emulated system operations.

16. The host system of claim 15 wherein combinations of said dual decor functions selected by combinations of said predetermined set of dual decor commands enable emulated system user operations to be performed by both said emulated system and host system in a collaborative manner.

* * * * *